United States Patent
Ge et al.

(10) Patent No.: US 10,312,810 B1
(45) Date of Patent: Jun. 4, 2019

(54) INTERLEAVED DC-DC CONVERTER HAVING STACKED OUTPUT CAPACITORS

(71) Applicant: FORD GLOBAL TECHNOLOGIES, LLC, Dearborn, MI (US)

(72) Inventors: Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/013,380

(22) Filed: Jun. 20, 2018

(51) Int. Cl.
*H02M 3/158* (2006.01)
*H02M 3/155* (2006.01)
*H02M 3/06* (2006.01)
*H02M 1/14* (2006.01)

(52) U.S. Cl.
CPC ............. *H02M 3/158* (2013.01); *H02M 1/14* (2013.01); *H02M 3/06* (2013.01); *H02M 3/155* (2013.01)

(58) Field of Classification Search
CPC .......... H02M 3/00; H02M 3/02; H02M 3/155; H02M 3/156; H02M 3/157; H02M 3/158; H02M 3/06; H02M 1/14
See application file for complete search history.

(56) References Cited

U.S. PATENT DOCUMENTS

| | | | |
|---|---|---|---|
| 7,518,886 B1 * | 4/2009 | Lai ........................... | H02P 8/12 363/17 |
| 8,125,205 B2 * | 2/2012 | Chandrasekaran . | H02M 3/1584 323/282 |
| 9,444,329 B2 | 9/2016 | Arno | |
| 9,855,850 B2 | 1/2018 | Chen et al. | |
| 2012/0163035 A1 * | 6/2012 | Song ................. | H02M 3/33584 363/17 |
| 2013/0194838 A1 * | 8/2013 | Jang .................... | H02M 1/4216 363/37 |
| 2016/0016479 A1 * | 1/2016 | Khaligh .............. | B60L 11/1812 363/17 |
| 2017/0163157 A1 | 6/2017 | Petersen | |
| 2017/0282747 A1 * | 10/2017 | Wang .................. | B60L 11/1811 |
| 2018/0367026 A1 * | 12/2018 | Rayner ................... | H02M 1/14 |

FOREIGN PATENT DOCUMENTS

CN 206211844 U 5/2017

* cited by examiner

*Primary Examiner* — Adolf D Berhane
(74) *Attorney, Agent, or Firm* — David Kelley; Brooks Kushman, P.C.

(57) ABSTRACT

A voltage converter includes a set of series connected capacitors collectively configured to provide voltage to an inverter. The voltage converter includes a switchgear including rails and switches configured to energize the capacitors with energy from the rails. The voltage converter includes interleaved inductors having respective half bridge switches configured to energize the rails. The voltage converter includes a controller configured to operate the switches of the switchgear to energize less than all of the set. The switch operation is responsive to a request to change the DC link voltage.

20 Claims, 4 Drawing Sheets

US 10,312,810 B1

INTERLEAVED DC-DC CONVERTER HAVING STACKED OUTPUT CAPACITORS

TECHNICAL FIELD

The present disclosure relates to an interleaved DC-DC converter having discrete output capacitors.

BACKGROUND

Interleaved converters provide reduced ripple currents to rails of an inverter and a battery. The rail voltage may have a direct impact on the output capabilities of the inverter. For instance, electric machines operated by the inverter may require an increased rail voltage in order to obtain desired speeds. Voltage converters may be unable to supply the required voltages or provide such voltages with high switching losses.

SUMMARY

A voltage converter includes a set of series connected capacitors collectively configured to provide voltage to an inverter. The voltage converter includes a switchgear including rails and switches configured to energize the capacitors with energy from the rails. The voltage converter includes interleaved inductors having respective half bridge switches configured to energize the rails. The voltage converter includes a controller configured to operate the switches of the switchgear to energize less than all of the set. The switch operation is responsive to a request to change the DC link voltage.

A voltage converter includes series connected capacitors collectively configured to provide voltage to an inverter. The voltage converter includes a switchgear including rails and switches configured to energize the capacitors with energy from the rails. The voltage converter includes interleaved inductors having respective half bridge switches configured to energize the rails. The voltage converter includes a controller configured to energize at a same time selected pairs of the interleaved inductors and capacitors to alter a gain of the voltage converter. The energization is responsive to a request to change the voltage.

A voltage converter includes series connected capacitors collectively configured to provide voltage to an inverter. The voltage converter includes a switchgear including rails and switches configured to energize the capacitors with energy from the rails. The voltage converter includes interleaved inductors having respective half bridge switches configured to energize the rails. The voltage converter includes a controller configured to energize one after another selected pairs of the interleaved inductors and capacitors to alter a gain of the voltage converter. The energization is responsive to a request to change the voltage.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As electric machines are implemented in a variety of applications requiring increased output and efficiency, inverters operating such electric machines may require increased voltage supplies. For example, electric machine speed may be limited by voltage supplied to rails of an inverter. The voltage of the rails may be provided by a DC-DC voltage converter. The voltage output of the voltage converter may be intrinsically limited by the switching duty cycle of the switches. To overcome this limit, output capacitors may be stacked to increase the output voltage of the voltage converter.

A switchgear may be implemented to selectively energize and deenergize the capacitors. Modulation schemas may be used to provide gains required by the inverter as requested. The modulation schemas may be chosen based on expected switching losses, gain selection precision, and gain versatility. For example, one modulation schema may provide requisite gain versatility, low loss, and result in inaccurate control at certain duty cycles. Other modulation schema may provide more reliable control over gain while having a reduced gain range. Indeed, output voltage of a converter may be increased using stacked capacitors, while modulation schemas are selected to ensure the proper output voltage is efficiently realized.

Figure 1:
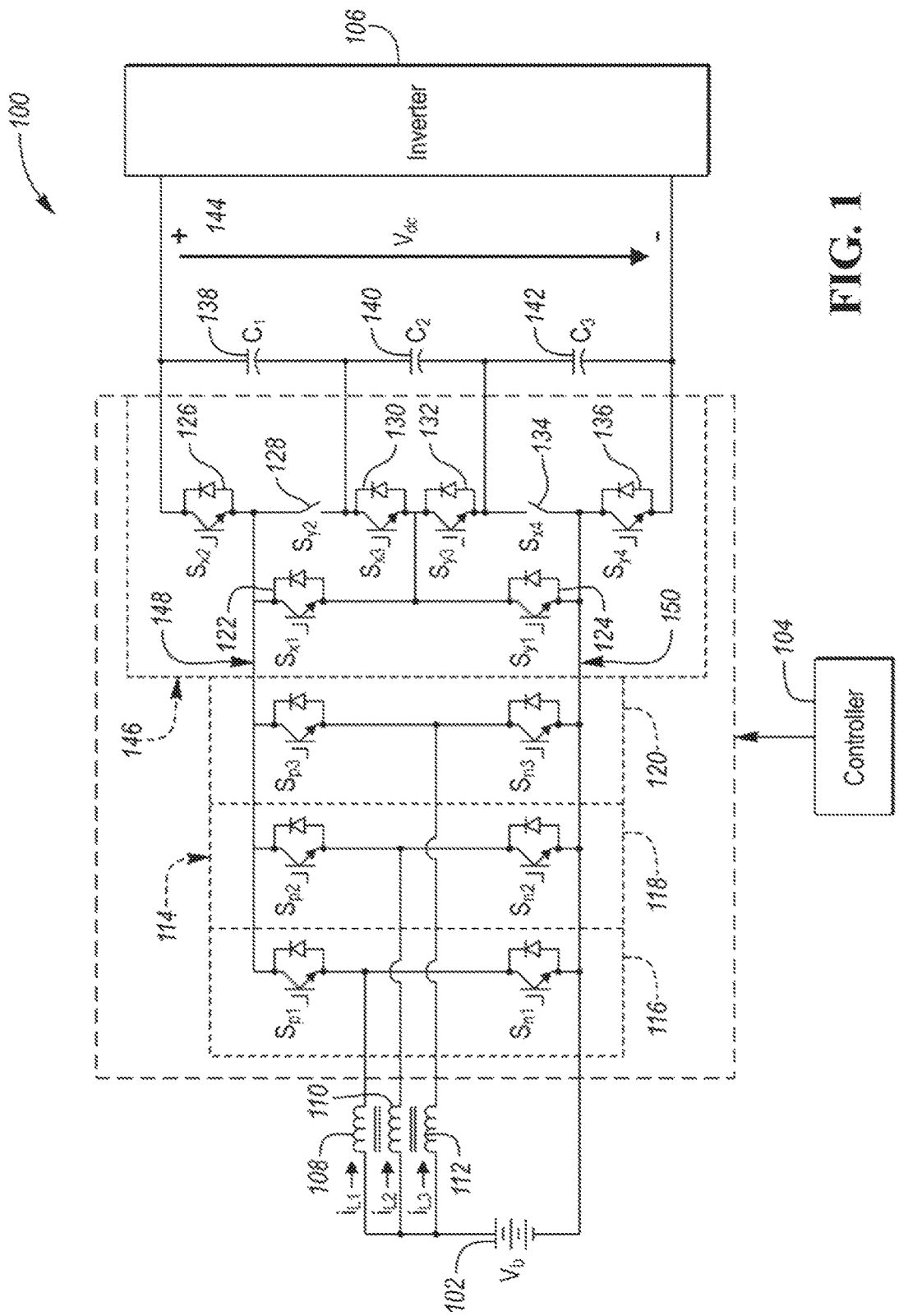
FIG. 1 is a schematic of a voltage converter having interleaved inductors and stacked capacitors.

Referring to FIG. 1, a voltage converter 100 is shown. The voltage converter 100 draws energy from the battery 102. The voltage converter 100 provides an inverter rail voltage 144 to the inverter 106. The inverter 106 may be configured to operate an electric machine (not shown). The electric machine may propel the vehicle or provide regenerative braking. The voltage converter may be controlled via a controller 104. The controller 104 may be a single processor or combination of multiple processors. The controller 104 may further include control algorithms or circuitry to provide pulse width modulation (PWM) signals to gates of the switches 114, 122, 124, 126, 128, 130, 132, 134, 136. The gates may be driven by a gate driver (not shown). The voltage converter 100 includes a set of series connected capacitors 138, 140, 142. Although three capacitors 138, 140, 142 are shown, additional capacitors—or fewer capacitors—may be used. The capacitors 138, 140, 142 may be energized via a switchgear 146 that has rails 148, 150 having positive and negative polarity. The rails 148, 150 are energized via interleaved inductors 108, 110, 112 having corresponding half bridge switches 116, 118, 120, respectively. The switchgear 146 includes a plurality of cascading switches 122, 124, 126, 128, 130, 132, 134, 136 configured to selectively energize the set of series connected capacitors 138, 140, 142. As shown in a non-limiting example, capacitor 138 is in parallel with switches 126, 128. As further shown, switches 122, 124 for a half bridge with the rails 148, 150. Additionally, switches 126, 128 form a half bridge with rail 148. As shown, the interleaved inductors 108, 110, 112 correspond with capacitors 138, 140, 142. The capacitors 138, 140, 142 may be any type of capacitors. The capacitors 138, 140, 142 may further be assembled unitarily or discretely. Meaning, the capacitors 138, 140, 142 may individually constructed or have multiple leads. The inductors 108, 110, 112 may also be constructed unitarily or discretely.

Figure 2:
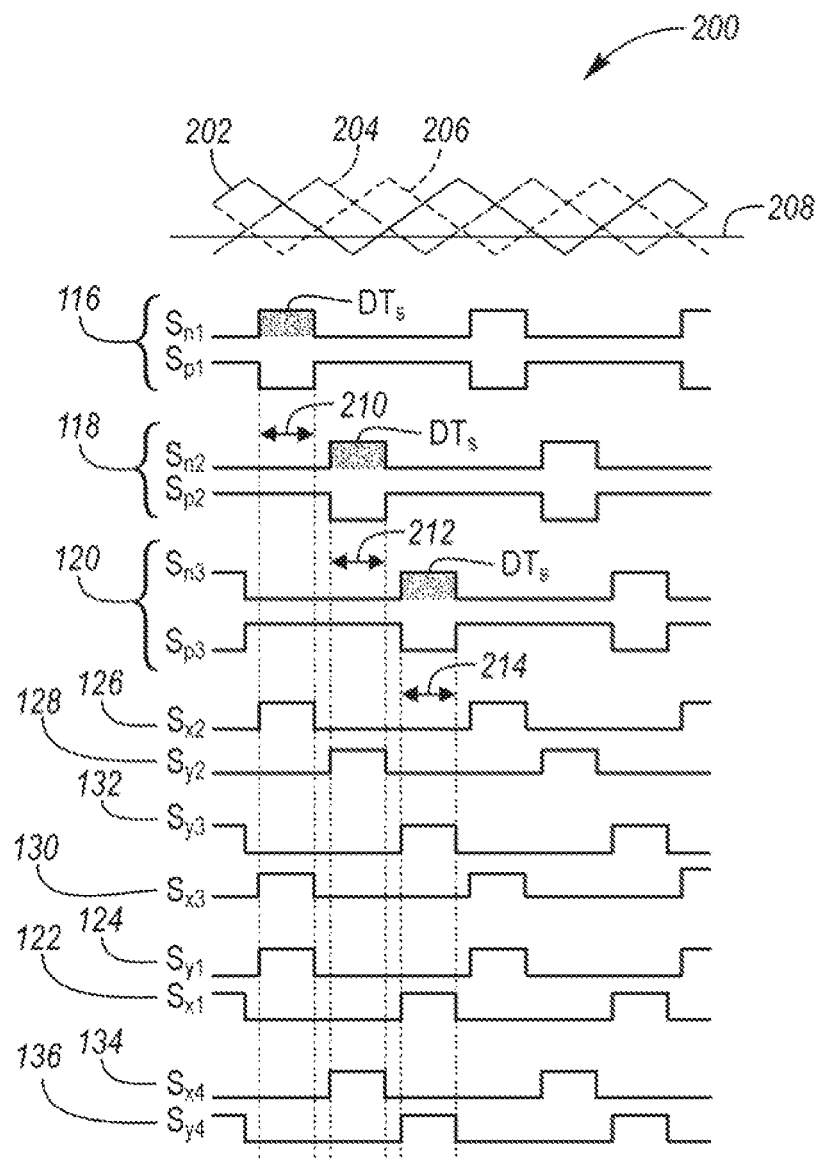
FIG. 2 is a timing diagram of switches of a voltage converter energized at a same time selected pairs of the interleaved inductors and capacitors.

Referring to FIG. 2, a timing diagram 200 according to Modulation Schema A is shown. The timing diagram 200 includes the carrier waves 202, 204, 206 as examples for each of the negative switches of the corresponding half bridges 116, 118, 120 and reference duty cycle 208. As shown the corresponding half bridge switch 116 operates such that when $S_{n1}$ is ON during the period of the duty cycle 210, $S_{p1}$ is OFF. The ON period of the duty cycle 210 forming a duty cycle corresponding to the half bridge switches 116. Additionally—and specific to Modulation Schema A—the switchgear 146 switches 126, 130, 124 are energized, forming a circuit including capacitor 138 such that capacitor 138 is charged when $S_{p1}$ is ON.

As shown the corresponding half bridge switch 118 operates such that when $S_{n2}$ is ON during the period of the duty cycle 212, $S_{p2}$ is OFF. The ON period forming a duty cycle 212 corresponding to the half bridge switches 118. Additionally—and specific to Modulation Schema A—the switchgear 146 switches 128, 134 are energized, forming a circuit including capacitor 140 such that capacitor 140 is charged when $S_{n2}$ is ON.

As shown the corresponding half bridge switch 120 operates such that when $S_{n3}$ is ON during the ON period of the duty cycle 214, $S_{p3}$ is OFF. The ON period forming a duty cycle 214 corresponding to the half bridge switches 120. Additionally—and specific to Modulation Schema A as shown in timing diagram 200—the switchgear 146 switches 132, 122, 136 are energized, forming a circuit including capacitor 142 such that capacitor 142 is charged when $S_{n3}$ is ON.

It should be appreciated that the duty cycles 210, 212, 214 are less than or equal to 33% such that all of the half bridge switches are energized during one collective cycle. Meaning, each duty cycle occurs before any of the other duty cycles repeat. Further, each capacitor 138, 140, 142 is energized while its respective inductor 108, 110, 112 is energized. More or less capacitors 138, 140, 142 and inductors 108, 110, 112 may be used. An implementation with more than three capacitors 138, 140, 142 may include a further cascade of switches in the switchgear 146 to allow individual energization of the capacitors. In such case, the duty cycle of the switchgear switches as mentioned above would be the mathematical reciprocal of the number of interleaved inductors (e.g., four capacitors would have a duty cycle of less than or equal to 25% under Modulation Schema A). As shown in FIG. 2, all of the capacitors in Modulation Schema A charge sequentially and exclusively. In such a situation, the gain of the voltage converter 100 is calculated according to Equation 1.

$$V_{DC} = \frac{3}{3-7D} V_b \tag{1}$$

where $V_{DC}$ is the voltage 144 of rails of the inverter 106 and $V_b$ is the voltage of the battery 102.

Figure 3:
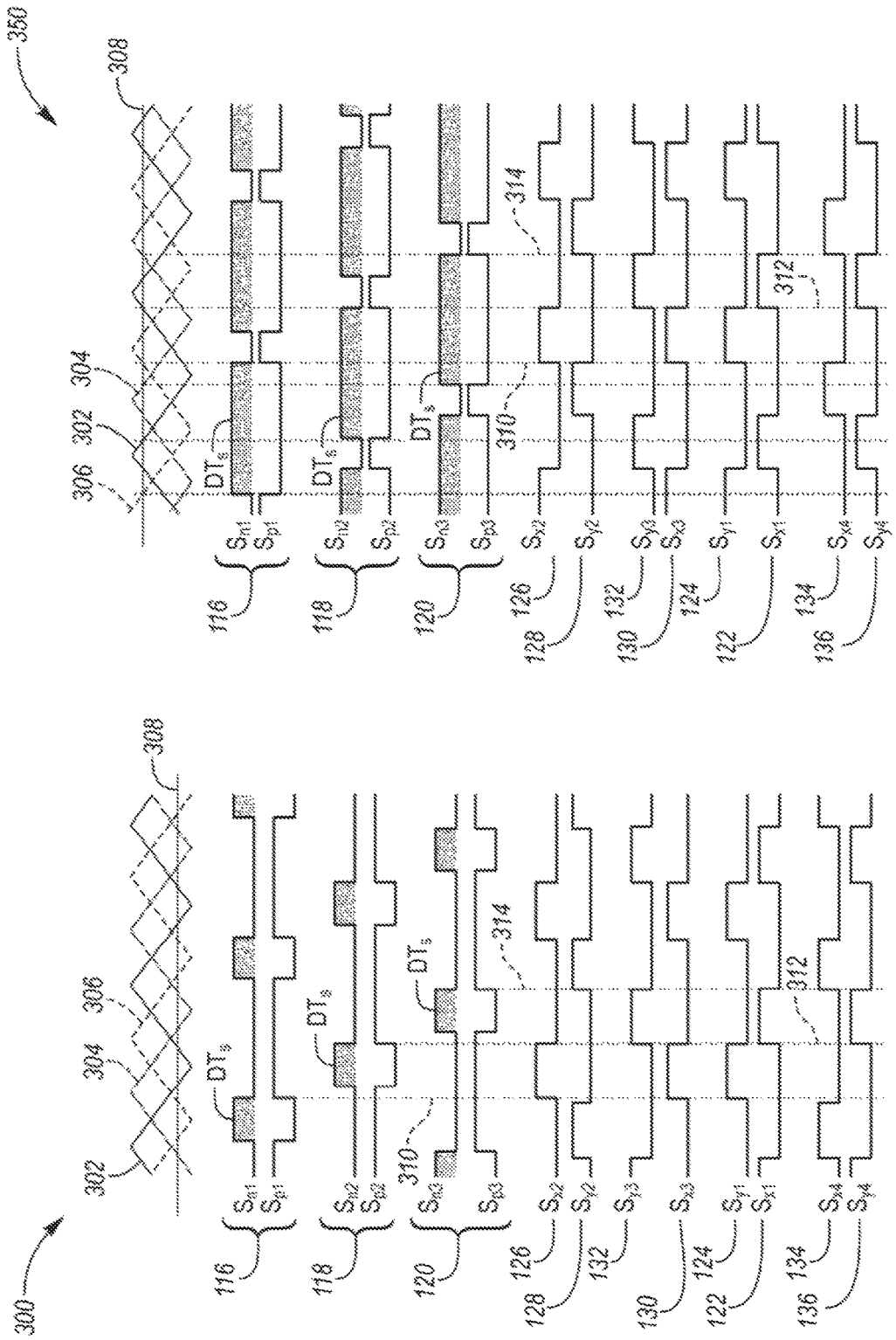
FIG. 3A is a timing diagram of switches energizing one after another selected pairs of the interleaved inductors and capacitors with a duty cycle less than or equal to 33%.
FIG. 3B is a timing diagram of switches energizing one after another selected pairs of the interleaved inductors and capacitors with a duty cycle greater than 33%.

Referring to FIGS. 3A and 3B, timing diagrams 300, 350 according to Modulation Schema B are shown. The timing diagram 300, 350 includes the carrier waves 302, 304, 306 as examples for each of the negative switches of the corresponding half bridges 116, 118, 120 and reference duty cycle 308. As shown the corresponding half bridge switch 116 operates such that the $S_{n1}$ falling edge 310 controls the corresponding switches and capacitor 138 charge period. The duty cycle is unrelated to the switch energization time in that all the switches of the switchgear 146 are energized according to a 33% duty cycle. Additionally—and specific to Modulation Schema B as shown in timing diagrams 300, 350—the switchgear 146 switches 126, 130, 124 are energized, forming a circuit including capacitor 138 such that capacitor 138 is charged according to the falling edge 310 of $S_{n1}$.

As shown the corresponding half bridge switch 118 operates such that the $S_{n2}$ falling edge 312 controls the corresponding switches and capacitor 142 charge period. Additionally—and specific to Modulation Schema B as shown in timing diagrams 300, 350—the switchgear 146 switches 132, 122, 136 are energized, forming a circuit including capacitor 142 such that capacitor 142 is charged according to the falling edge 312 of $S_{n2}$.

As shown the corresponding half bridge switch 120 operates such that the $S_{n3}$ falling edge 314 controls the corresponding switches and capacitor 140 charge period. Additionally—and specific to Modulation Schema B as shown in timing diagrams 300, 350—the switchgear 146 switches 128, 134 are energized, forming a circuit including capacitor 140 such that capacitor 142 is charged according to the falling edge 314 of $S_{n3}$.

It should be appreciated that the duty cycles for Modulation Schema B of the corresponding half bridge switches 116, 118, 120 can be any value between 0-100%, which is different from Modulation Schema A shown above. Further, each capacitor 138, 140, 142 is not necessarily charged at the same time as its respective inductor 108, 110, 112. More or less capacitors 138, 140, 142 and inductors 108, 110, 112 may be used. An implementation with more than three capacitors 138, 140, 142 may include a further cascade of switches in the switchgear 146 to allow individual energization of the capacitors. In such case, the duty cycle of the switchgear switches as mentioned above would be the mathematical reciprocal of the number of interleaved inductors (e.g., four capacitors would have a duty cycle of 25% under Modulation Schema B). The duty cycle of the corresponding half bridges, however, would still be any duty cycle required to generate the requested gain. As shown in FIGS. 3A and 3B, all of the capacitors in Modulation Schema B charge sequentially and exclusively but the corresponding half bridge switches 116, 118, 120 do not. In such a situation, the gain of the voltage converter 100 is calculated according to Equation 2.

$$V_{DC} = \frac{3}{1-D}V_b \quad (2)$$

where $V_{DC}$ is the voltage 144 of rails of the inverter 106 and $V_b$ is the voltage of the battery 102.

Figure 4:
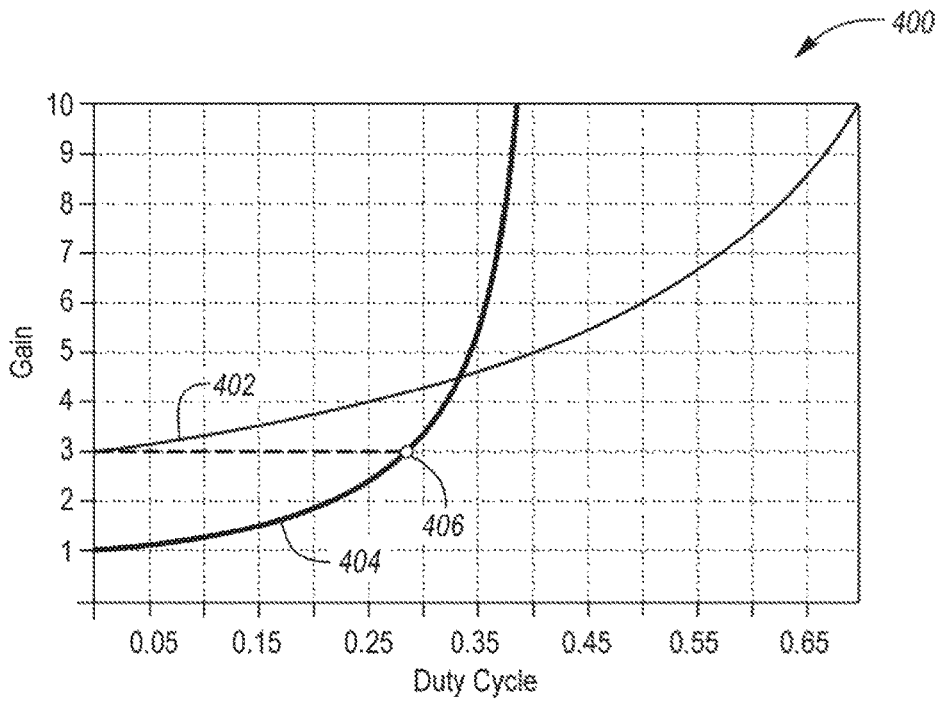
FIG. 4 is a graph showing voltage converter gain with respect to a duty cycle of the switches under two different modulation schemas.

Referring to FIG. 4, a graph 400 is shown. The graph 400 depicts Modulation Schema A 404 and Modulation Schema B 402 with respect to gain and duty cycle. As shown in the graph 400, Modulation Schema A 404 provides a minimum gain of one for low duty cycles. Modulation Schema B 402 provides a minimum gain of three for low duty cycles. Low gain values may be necessary to reduce conversion losses and provide all requested voltages to the inverter rail voltage 144. A lower duty cycle will reduce converter switching losses (e.g., resistive losses). Therefore, gains requested that are greater than modulation decision point 406 (e.g., three) of Modulation Schema A 404 at a duty cycle of 28.6% entice the controller to switch to Modulation Schema B duty cycle, so that the converter gain will be three and have a low duty cycle, as described in FIG. 5.

Figure 5:
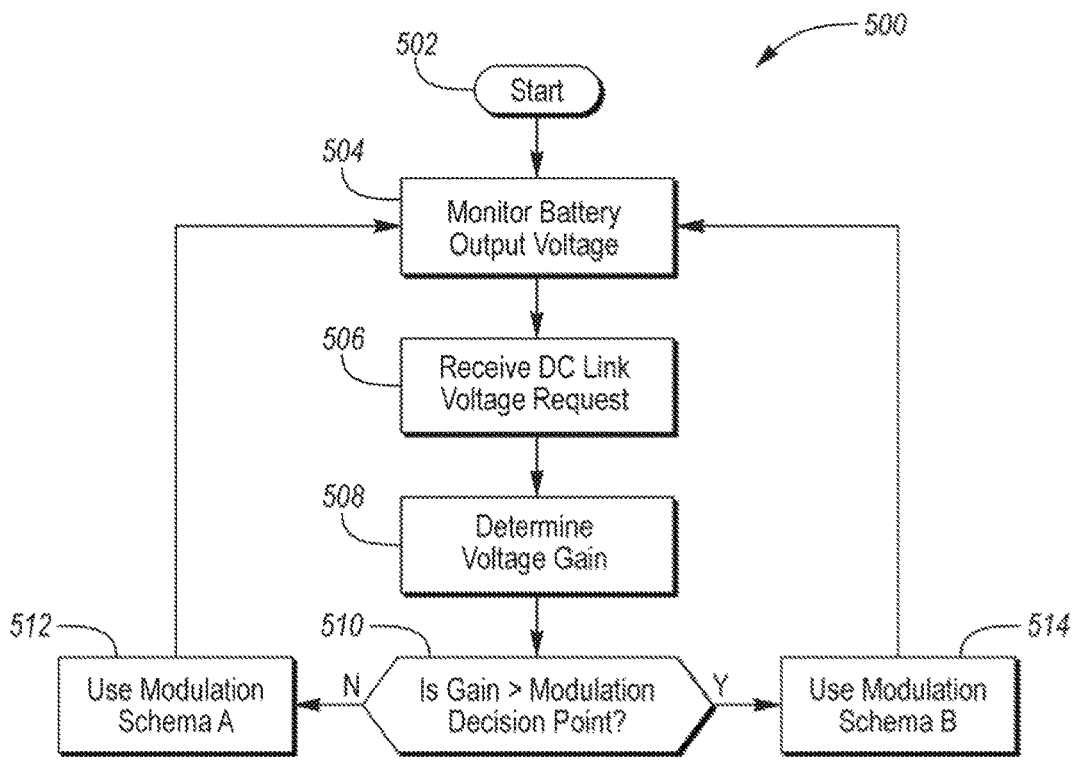
FIG. 5 is an algorithm for implementing the modulation schemas.

Referring to FIG. 5, an algorithm 500 for the controller 104 is shown. In step 502, the algorithm begins. In step 504 the controller 104 monitors the battery voltage. Such monitoring may be performed by a battery electronics control module or other implements known in the art. In step 506 the controller receives the DC link voltage request. The DC link voltage request may be in the range of 100 to over 1000 Volts. In step 508 the controller 104 determines the requested gain as a function of the battery voltage determined in step 504 and the request received in step 506. In step 510 the controller 104 determines whether to use Modulation Schema A or Modulation Schema B. If the gain requested is greater than the modulation decision point 406, the controller 104 will use Modulation Schema B 402 as shown in FIGS. 3A-B. If the gain requested is less than the modulation decision point 406, the controller 104 will use Modulation Schema A 404 as shown in FIG. 2. The controller 104 may further adjust the intersection point 406 according to operating conditions and the modulation decision point 406 may be more or less than the 28.6% duty cycle.

The controller 104 may include various types of computing apparatus in support of performance of the functions of the controller 104 described herein. In an example, the controller 104 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A voltage converter comprising:
   a set of series connected capacitors collectively configured to provide voltage to an inverter;
   a switchgear including rails and switches configured to energize the capacitors with energy from the rails;
   interleaved inductors having respective half bridge switches configured to energize the rails; and
   a controller configured to, responsive to a request to change a DC link voltage, operate the switches of the switchgear to energize less than all of the set.

2. The voltage converter of claim 1, wherein the switchgear switches form a cascade that provides individual energization of discrete capacitors of the set.

3. The voltage converter of claim 1, wherein one of the capacitors is in parallel with two of the switchgear switches.

4. The voltage converter of claim 1, wherein a portion of the switchgear switches form a half bridge with a one of the rails.

5. The voltage converter of claim 1, wherein three of the interleaved inductors correspond with three of the capacitors.

6. The voltage converter of claim 1 further comprising, a controller configured to, responsive to a request to change the DC link voltage, energize at a same time selected pairs of the interleaved inductors and capacitors to alter a gain of the voltage converter.

7. The voltage converter of claim 6, wherein a duty cycle (D) of the switchgear switches is less than or equal to a mathematical reciprocal of a number of the interleaved inductors.

8. The voltage converter of claim 7, wherein each of the capacitors energize in sequence.

9. The voltage converter of claim 7, wherein each of the capacitors energize exclusive of the other capacitors.

10. The voltage converter of claim 7, wherein a gain of the voltage converter is $$\frac{3}{3-7D}.$$

11. The voltage converter of claim 7, wherein a duty cycle (D) of energization of the interleaved inductors is less than or equal to a mathematical reciprocal of a number of the interleaved inductors.

12. The voltage converter of claim 1 further comprising, a controller configured to, responsive to a request to change the DC link voltage, operate the switchgear switches associated with the capacitors such that the respective capacitors energize on a falling edge of the corresponding interleaved inductors energization.

13. The voltage converter of claim 12, wherein the operation of the switchgear switches is such that the respective capacitors deenergize according to a duty cycle that is less than or equal to a mathematical reciprocal of a number of the interleaved inductors.

14. The voltage converter of claim 13, wherein a duty cycle (D) of at least one of the switchgear switches is one third of a carrier wave period of the switchgear switches.

15. The voltage converter of claim 13, wherein a duty cycle (D) of at least one of the switchgear switches is one third the period of a carrier wave of the half bridge switches.

16. The voltage converter of claim 15, wherein a gain of the voltage converter is $$\frac{3}{1-D}.$$

17. The voltage converter of claim 13, wherein a duty cycle (D) of at least one of the interleaved inductors is one third the period of a carrier wave of the half bridge switches.

18. The voltage converter of claim 1 further comprising, a controller configured to, responsive to receiving a request to change the DC link voltage, operate the switchgear switches associated with the capacitors such that respective capacitors energize while corresponding interleaved inductors energize and a gain associated with the DC link voltage is less than an decision point value and to operate the switchgear switches associated with the capacitors such that the respective capacitors energize on a falling edge of the corresponding interleaved inductors energization while the gain is above the decision point value.

19. A voltage converter comprising:
series connected capacitors collectively configured to provide voltage to an inverter;
a switchgear including rails and switches configured to energize the capacitors with energy from the rails;
interleaved inductors having respective half bridge switches configured to energize the rails; and
a controller configured to, responsive to a request to change the voltage, energize at a same time selected pairs of the interleaved inductors and capacitors to alter a gain of the voltage converter.

20. A voltage converter comprising:
series connected capacitors collectively configured to provide voltage to an inverter;
a switchgear including rails and switches configured to energize the capacitors with energy from the rails;
interleaved inductors having respective half bridge switches configured to energize the rails; and
a controller configured to, responsive to a request to change the voltage, energize one after another selected pairs of the interleaved inductors and capacitors to alter a gain of the voltage converter.

* * * * *